United States Patent [19]

McCullough

[11] Patent Number: 4,587,435

[45] Date of Patent: May 6, 1986

[54] TURBINE

[76] Inventor: Ross McCullough, 4101 Bath Road, Kingston, Ontario, Canada, K7M 4Y8

[21] Appl. No.: 608,859

[22] Filed: May 10, 1984

[51] Int. Cl.$^4$ .............................................. F15D 1/02
[52] U.S. Cl. ........................................ 290/54; 290/52
[58] Field of Search ............... 290/43, 52, 54; 415/83, 415/84; 416/180; D23/1

[56] References Cited

U.S. PATENT DOCUMENTS

| | | | |
|---|---|---|---|
| 1,485,186 | 2/1924 | Harza | 290/52 X |
| 2,861,195 | 11/1958 | Salzer | 290/52 X |
| 4,109,160 | 8/1978 | Goto et al. | 290/52 |
| 4,182,123 | 1/1980 | Ueda | 290/54 X |
| 4,272,685 | 6/1981 | Toyama | 290/52 |
| 4,282,444 | 8/1981 | Ramer | 290/52 |
| 4,311,410 | 1/1982 | Atencio Gutierrez | 290/52 X |
| 4,364,228 | 12/1982 | Eller | 290/52 X |

Primary Examiner—William M. Shoop, Jr.
Assistant Examiner—W. E. Duncanson, Jr.
Attorney, Agent, or Firm—Stanley E. Johnson

[57] ABSTRACT

The water fall from a higher to a lower elevation is through an annular passageway having one or more turbines driven by the water as it flows through the column. The water flow is preferably a siphon action entry to the annular column being by way of an inverted U-tube with the inlet thereto immersed below the water level. The column is designed with offset portions whereby a plurality of turbines can be located downstream from one another in the column and laterally offset so that the turbines rotate about axes spaced apart horizontally from one another, each turbine or series of turbines driving an electric generator. The annular column is provided by two concentric shells or conduits spaced apart from one another, the flow of water being in the space between the shells.

15 Claims, 5 Drawing Figures

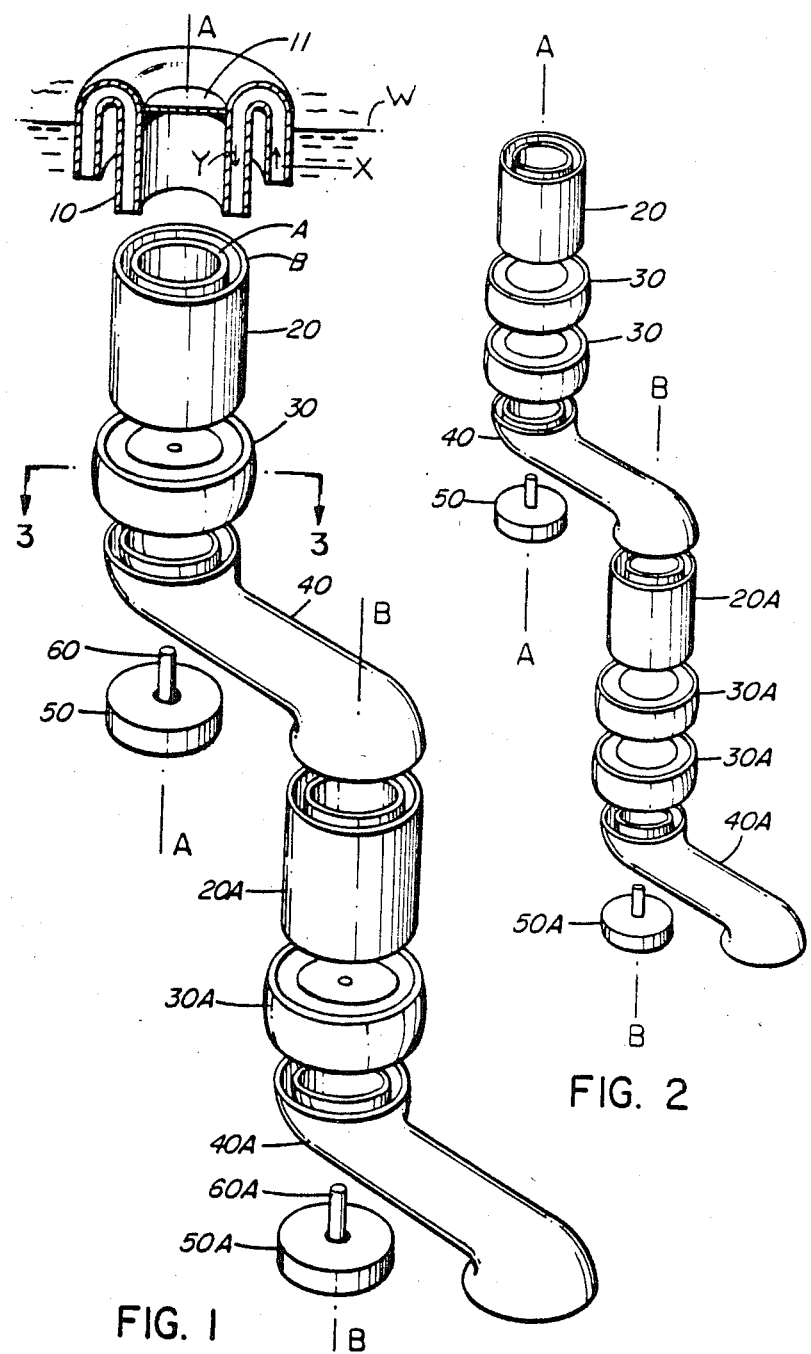

TURBINE

BACKGROUND OF INVENTION

This invention relates to the production of hydro-electric energy from a fall of water through a penstock.

The present day hydro-electric system is based on water flowing into a penstock and thence by gravity flow through a scroll case. The flowing water is guided by suitable conduit means so as effectively to be a solid column of water flowing and the swirl of the water in the scroll case is directed into and drives a turbine wheel. The water passes through the wheel into a draft tube and onto the tail race. Normally, the turbine wheel and generator are situated at the lowest practical point on a gravity fall of water. Manufacturers and hydro-electric companies state that modern turbine wheels have an efficiency rating of up to 97%.

One aspect of the invention resides in a newly designed penstock, where instead of having the water as is presently done flow as a solid column through a pipe, it flows as an annular column. Another aspect resides in a re-design of the turbine wheel so as to be driven by the annular column of flowing water.

Another aspect of the invention resides in designing the system so there is laminar flow of the water.

Another principal aspect of the present invention is based on the principle of siphonage which means that the gravity rate of flow is uniform throughout the flow. In other words, the water no longer flows into a penstock as is the case with known devices but instead is drawn thereinto, the entire column acting as a siphon.

Applicant's type of penstock reduces or eliminates vortex action normally present in existing designs and the subsequent turbulent flow encountered also in the flow entrances of standard penstocks.

As will be seen hereinafter, the turbine design eliminates the use of a scroll case and a design where the leverage factor is increased substantially over a standard turbine wheel.

Another aspect of the present invention is the use of multiple turbine wheels in a confined gravity fall of water and such fall of water flowing by way of siphon action. In a low head installation, one or more turbine wheels may be mounted on a common shaft and in high head situations, a staggered arrangement is provided with multiple turbines spaced apart in the direction of flow and offset from one another so as to be located on different vertical axes.

LIST OF DRAWINGS

The invention is illustrated by way of example with reference to the accompanying drawings wherein:

FIG. 1 is an exploded diagrammatic view of a hydro power system provided in accordance with the present invention;

FIG. 2 similarly is an exploded diagrammatic illustrational view incorporating minor modifications to the system;

DESCRIPTION OF PREFERRED EMBODIMENTS

Figure 3:
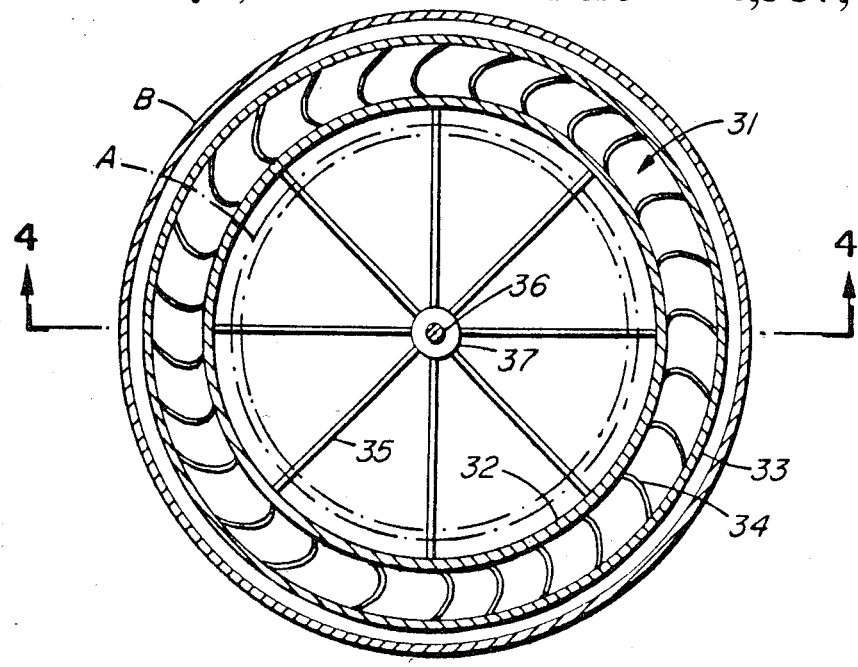
FIG. 3 is a partial sectional view taken essentially along line 3—3 of FIG. 1 illustrating the turbine provided in accordance with the present invention for the hydro-electric power generating system.

Referring to FIG. 1 there is diagrammatically illustrated in an exploded view the basic components of a hydro-electric power generating system provided in accordance with the present invention. Illustrated is a U-tube inlet 10 followed by a fluid flow conduit 20, a water turbine case 30, an offset conduit 40, and an electric generator 50, driven by a turbine in the turbine case 30. The turbine and generator are connected by a shaft 60 supported and mounted for rotation about a vertical axis A—A. The water flow from offset conduit 40 is into a further conduit 20A, a turbine case 30A, an offset conduit 40A. A turbine rotor in turbine case 30A drives a generator 50A by way of drive shaft 60A, the rotation of which is about an axis B—B, offset horizontally from the axis A—A. Only two offset units are illustrated, i.e. one on axis A—A and one on axis B—B. It is to be understood that further offset units can be included dependent upon the height of water fall and vertical spacing of the turbines for the water fall.

In FIG. 1 there is illustrated only one turbine unit 30 on the axis A—A and one turbine unit on the vertical axis B—B. As illustrated in FIG. 2 there are two turbine units 30 on the same axis and which would be connected by a shaft for driving the generator 50. The offset tube 40 permits having further serially connected units operating on another axis of rotation should one so desire. There may be as many different offset units as desired dependent upon the vertical drop. As by way of example the turbine units would be located at for example ten foot intervals in the vertical fall of the water.

The water flow passage through the interconnected conduits and turbine case is an annular fluid flow passageway which may be of any desired diameter, for example, two to five feet or more. The annular fluid flow passage is defined by an inner shell A and an outer shell B disposed concentrically and spaced apart radially from one another, the water fluid flow being between the shells. The shells are cylindrical and of any desired diameter. The spacing between the shells is designed, relative to the head of water, to ensure laminar flow operating under a siphon condition. The U-tube entrance 10 is a siphon entrance with the water level being designated W below which is located the entry to the annular passage. The water in the entry flows initially upwardly in the direction of arrow X and then downwardly in the direction of arrow Y, continuing therefrom on through the conduit 20, turbine case 30, and offset tube 40.

In essence, the fluid flow path constitutes two large pipes, one inside the other, with a space therebetween. Water flows between the spaced apart pipes. The spacing between the pipes in the vertical column and the spacing between the pipes at the inlet of the U-siphon tube is such as to maintain a column of flowing water without the introduction of air into the system.

The center portion of the inner shell is blocked off by metal plates 11, one being shown at the upper end of the siphon tube and others at various different positions therealong.

Figure 4:
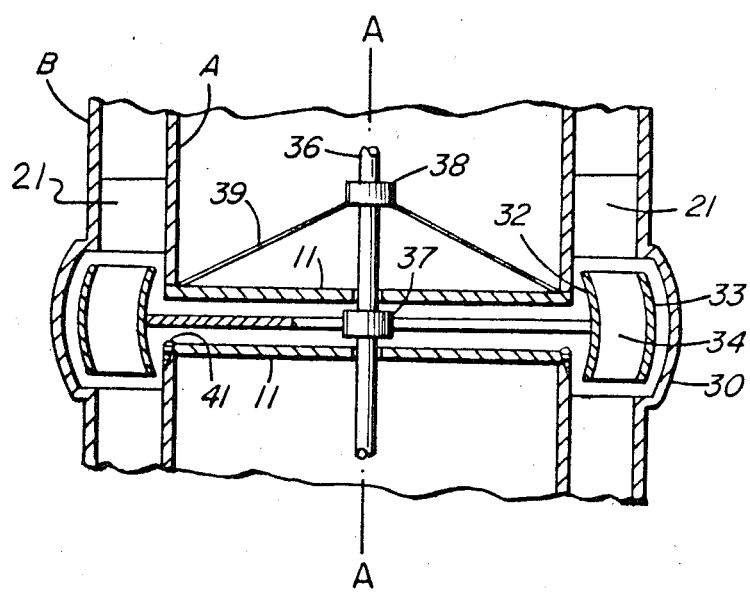
FIG. 4 is a partial sectional view taken along line 4—4 of FIG. 3.
Figure 5:
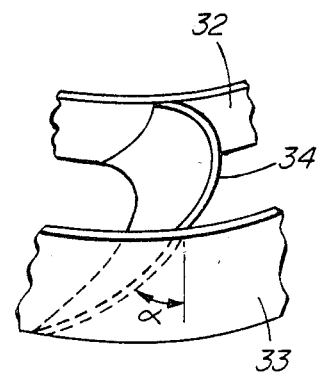
FIG. 5 is a partial oblique view illustrating one of the vanes in the turbine illustrated in FIGS. 3 and 4.

The annular column of water flowing between conduits A and B is directed by a plurality of fixed vanes 21, appropriately angled and curved for maximum efficiency in directing the water flow onto a turbine rotor 31 in the turbine casing 30. The turbine rotor includes an inner ring 32 and an outer ring 33 interconnected by a plurality of rotor vanes 34 appropriately curved and sloped to maximize and obtain highest efficiency in transferring the energy of the flowing water into driving the rotor about the axis A—A. The depth of the shells 32 and 33, in the direction of fluid flow may be the same, as illustrated in FIG. 4, or alternatively the inner shell may be shallower than the outer shell as illustrated in FIG. 5. As will be noted from FIGS. 3 and 5 the rotor blades are curved, as seen in plan view, and sloped, at an angle designated α in FIG. 5 in reference to direction parallel to the axis of rotation.

The inner rim 32 is connected to a plurality of spokes 35 as illustrated (or alternatively a disc) attached to a vertical shaft 36 mounted for rotation on a suitable journal means 37. The shaft 36 can be stabilized by additional means 38 if so desired, supported by suitable struts 39. The journal 37, the spokes 35 (or disc as the case may be) is located between a pair of plates 11 secured to the inner tube in spaced apart relation providing a space therebetween for the journal and spokes.

The design of the rims 32 and 33 and turbine casing 30 is preferably such that there is a venturi effect in the flow of the water through the turbine casing whereby little, if any water accumulates between the turbine casing and turbine rotor during operation of the turbine. An annular bearing means and/or seal 41 may be provided to prevent flow of water into the space between the pair of plates 11 where the spokes (or disc as the case may be) connects the inner rim of the turbine rotor to the vertical shaft.

In the embodiment illustrated in FIG. 1, there is a U-tube with entry to the column of water being below the water surface. This provides a siphoning effect. In the embodiment illustrated in FIG. 2, the U-tube has been omitted and it is to be understood the annular column of flowing water can be utilized without the siphoning effect should one so desire. The preferred embodiment however, is with the U-tube and operating under a siphoning action for the entire fluid flow through the column.

When the system is operating as a siphoning condition, it will be necessary for initial start-up to effect pumping of water into the column in order to get it to flow or alternatively in place of pumping there may be a suitable valve provided which can be opened to allow water flow into the column and thereafter closed so that further flow of the water is by way of siphoning.

Air release or bleed valves may also be included in this system to relieve or allow the escape of any air which may accumulate in the annular column of water flow.

In the drawings, the generators are illustrated as being located below the turbine. This need not be so as the generators can be located at any place and in fact could be located within the center portion of the column should one so desire. In such instance, access hatches through the tubing would be required in order to get at the generators for maintenance purposes. In the preferred embodiment of the invention, the tail race, i.e. the outlet from the bottom end of the conduit is submerged under water for the purpose of ensuring no air can be drawn back into the column.

The embodiments of the invention in which an exclusive property or privilege is claimed are defined as follows:

1. In a hyudro-electric power generating system the improvement comprising directing an annular column of water flow, from the intake thereof from a head of water, through a turbine drivingly connected to an electric generator and through to the discharge at an elevation below said intake.

2. The improvement as defined in claim 1 wherein there are a plurality of turbines spaced apart from one another in the direction of water flow.

3. The improvement as defined in claim 1 wherein the entry at the upper end of the annular column is a U-tube having an entry passage thereto immersed in the body of water such that flow through the annular column is by way of siphoning.

4. In a hydro-electric generating system wherein water flows downwardly through a turbine drivingly connected to an electric generator the improvement comprising directing the water flow as an annular column from the source thereof downwardly to and through the turbine to a discharge for the water at an elevation lower than said source.

5. The improvement as defined in claim 4 wherein the turbine comprises a plurality of vanes located in an annular housing and mounted by support means for rotation about the central axis of the annular housing.

6. The improvement as defined in claim 5 wherein the vanes are fixedly secured to an inner and outer rim.

7. The improvement as defined in claim 6 wherein the outer rim is longer in the direction of water flow than the inner rim.

8. The improvement as defined in claim 4 wherein there are a plurality of turbines spaced apart from one another in the direction of water flow.

9. The improvement as defined in claim 8 wherein at least some of the turbines are offset horizontally from one another.

10. The improvement as defined in claim 4 wherein said annular column of water flow comprises a plurality of portions in series laterally offset from one another and wherein there is at least one turbine in each of said plurality of portions.

11. The improvement as defined in claim 4 including a plurality of fixed vanes in said annular column adjacent to but upstream from said turbine.

12. The improvement as defined in claim 5 wherein said annular housing is designed to provide a venturi effect in the flow of water therethrough.

13. The improvement as defined in claim 4 wherein said annular column is designed to cause laminar flow of water through such column.

14. The improvement as defined in claim 4 wherein the column of water flow is a siphon.

15. The improvement as defined in claim 14 wherein entry to the column is via a U-tube.

* * * * *